United States Patent [19]

Derner

[11] 3,934,957

[45] Jan. 27, 1976

[54] PRELOADED DOUBLE ROW SPHERICAL ROLLER BEARING

[75] Inventor: William J. Derner, Indianapolis, Ind.

[73] Assignee: FMC Corporation, San Jose, Calif.

[22] Filed: Feb. 13, 1974

[21] Appl. No.: 442,023

[52] U.S. Cl. .............................. 308/207 A; 308/194
[51] Int. Cl.² ......................................... F16C 23/00
[58] Field of Search ........... 308/177, 184, 207, 194, 308/196, 214, 207 A

[56] References Cited
UNITED STATES PATENTS

| | | | |
|---|---|---|---|
| 2,747,951 | 5/1956 | Wallgren | 308/214 |
| 3,351,398 | 11/1967 | Park et al. | 308/177 |
| 3,845,999 | 11/1974 | Zimmer et al. | 308/207 |

Primary Examiner—M. Henson Wood, Jr.
Assistant Examiner—Richard A. Bertsch
Attorney, Agent, or Firm—J. F. Verhoeven; C. E. Tripp

[57] ABSTRACT

A double row spherical roller bearing has a pair of inner races formed on a unitary member and a pair of outer races formed on spaced apart ring members. A housing with an internal nut received therein forms an annular channel to embrace the split outer race ring members. A spring is mounted between one leg of the channel and one race ring member to exert an axial preload force on the ring members. A pair of spring members is mounted between the outer race members to constitute a restoring force and cushion the outer race members.

3 Claims, 5 Drawing Figures

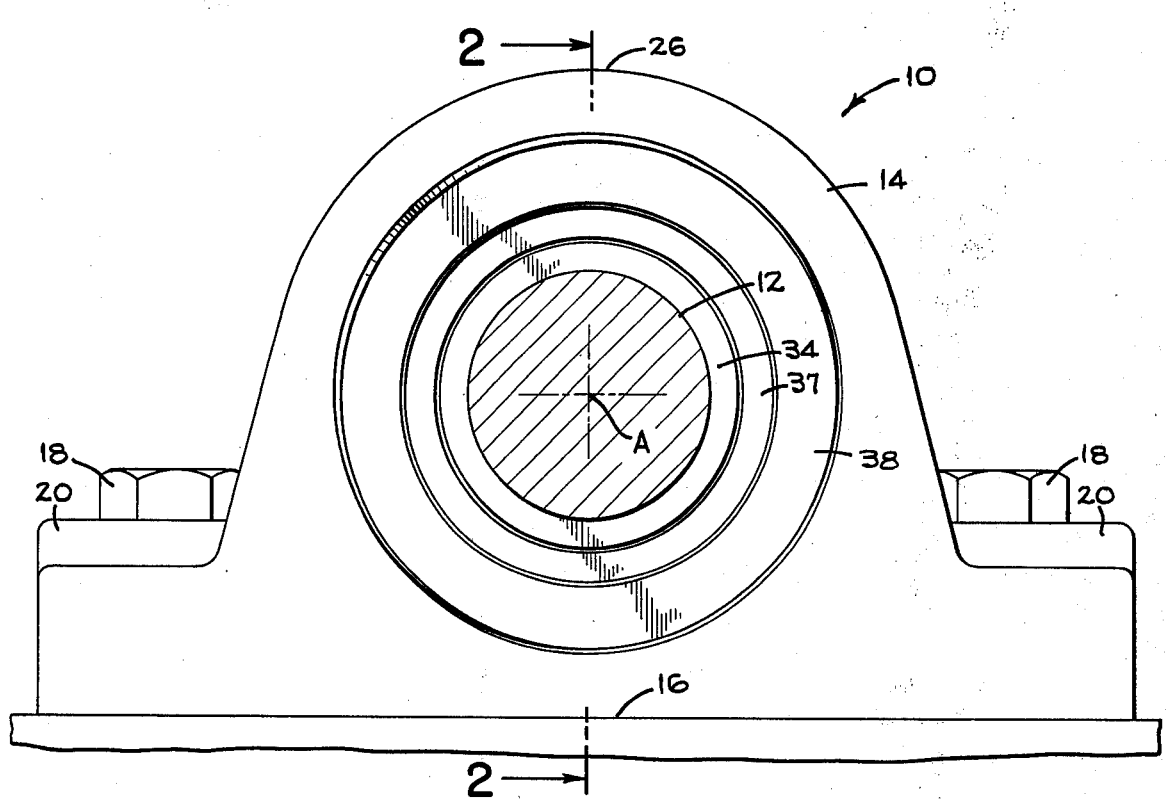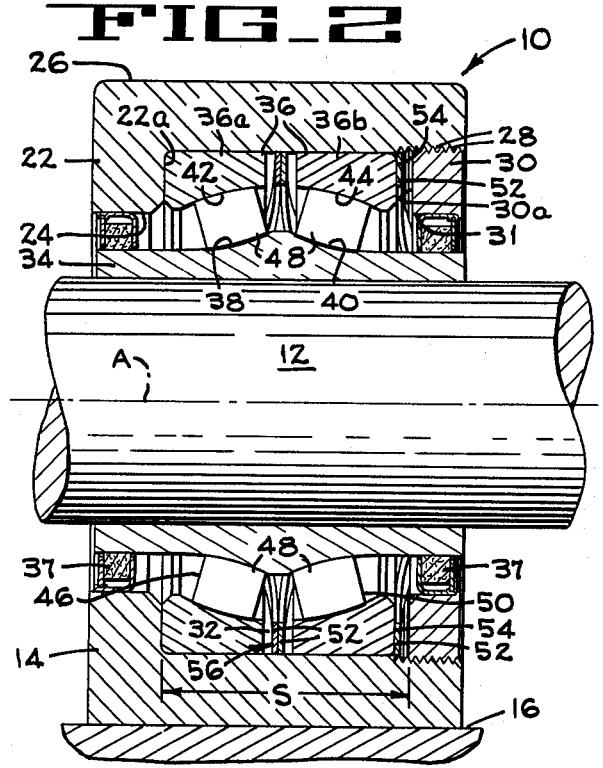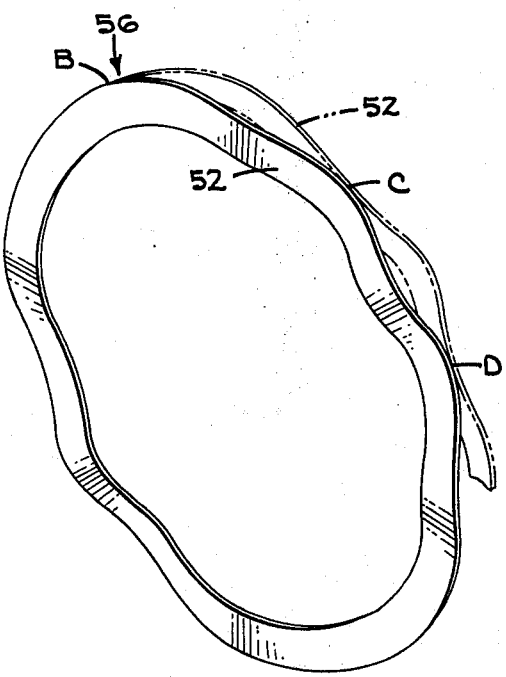

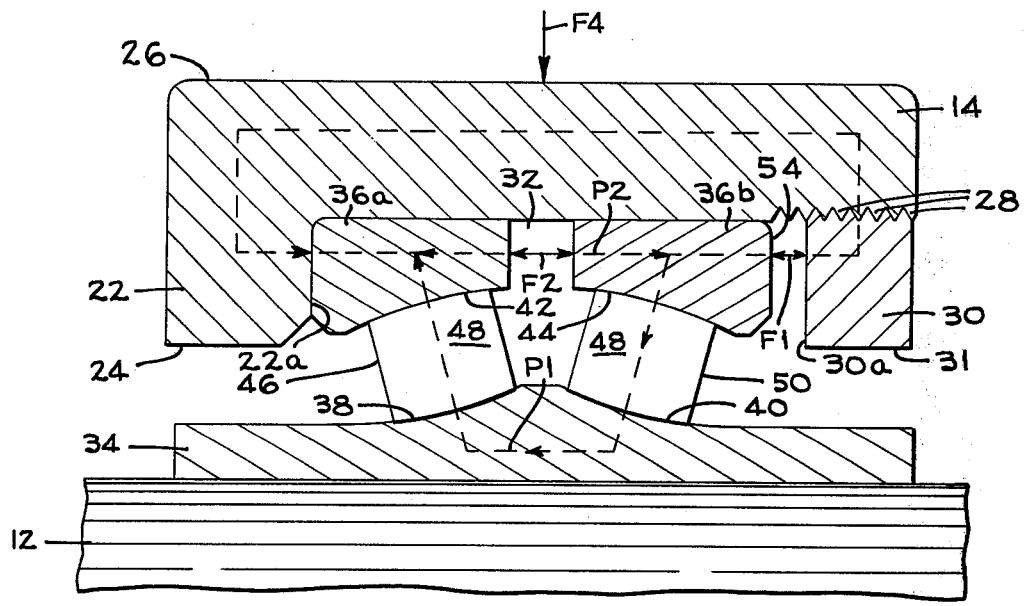
FIG_4
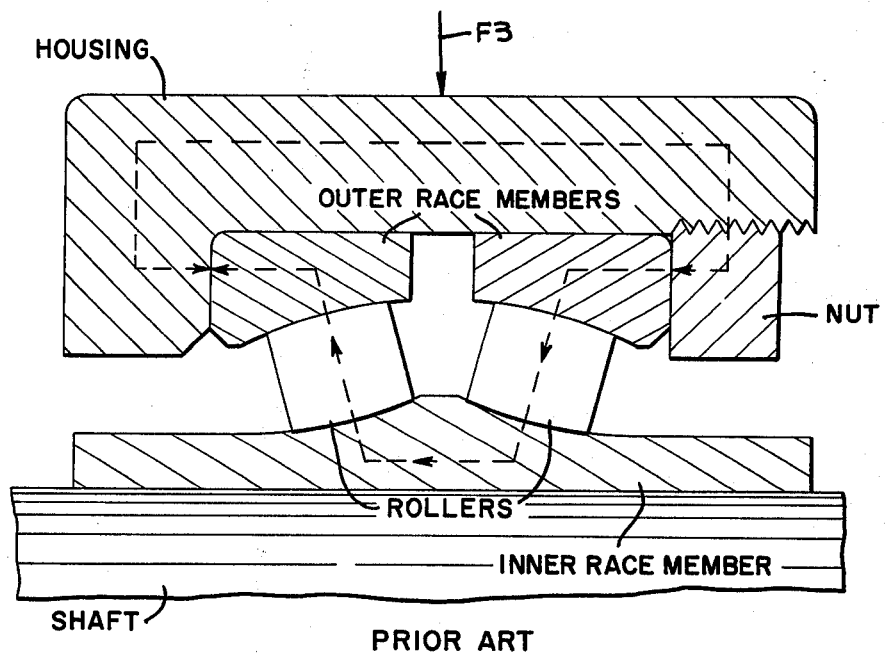
PRIOR ART
FIG_5

PRELOADED DOUBLE ROW SPHERICAL ROLLER BEARING

BACKGROUND OF THE INVENTION

In a typical double row antifriction bearing, such as a roller bearing as shown in FIG. 5, there is provided a housing in which an inner race means and an outer race means are mounted. Usually, one of said race means, such as the outer race means, consists of two spaced apart race members (each with a raceway to receive the bearing rollers) while the other race means (the inner race means) may be a single race member with two raceways to receive the bearing rollers. Usually, one of the race members of the split race means abuts against one end of the housing, while the other race member of the split race means abuts against a nut received in the housing. Although the bearing shown in FIG. 5 is a spherical bearing, a similar arrangement can be used with other multi-row bearings such as tapered roller or ball bearings.

When the nut is tightened in the housing a preload force is placed on the bearing members to prevent any looseness or play in the assembly under fluctuating loads.

Assuming the outer race means consists of two race members and the inner race means consists of a single race member in a double row spherical roller bearing, the preload force will be transmitted from the nut to one outer race member, through one row of rollers to the inner race member. From the inner race member, the force will be transmitted through the other row of rollers to the other outer race member, and back to the housing. One difficulty with this arrangement is that any wear of the bearing elements, or looseness of the nut, diminishes the preload force until vibration of the bearing members will begin. Another difficulty with this arrangement is that the preload is added to the fluctuating load on the bearing, to increase the wear on the rollers and race members.

SUMMARY OF THE INVENTION

In order to alleviate these difficulties, there is provided in the preferred embodiment of the invention, a first resilient member (such as a corrugated washer spring) between the nut and one of the outer race members (assuming, for illustrative purposes, that the outer race means consists of two separate outer race members), and a second resilient member between the two outer race members.

Although both springs serve to preload the bearing assembly, the first spring transmits a preload force from the nut (and housing) to the outer ends of the outer race members, while the second spring acts as a reactionary, or restoring, force which biases the outer race members apart and serves to transmit at least part of the preload force directly between outer race members and around the two rows of rollers. This second spring may be of varying active lengths so that its action may be delayed until a preselected advance of the outer ring is achieved. Thus, the two outer race members are resiliently mounted with respect to each other to preload the bearing assembly without significantly increasing the load on the bearing rollers over the normal operating load.

It is therefore one object of the present invention to resiliently mount the race members of a double row spherical bearing.

It is another object of the present invention to provide a resilient reactionary force to counter the resilient preloading force in a double row spherical bearing.

It is yet another object of the present invention to provide a resilient mounting of the race members of a double row spherical bearing where some of the preloading force is transmitted around the rows of rollers.

BRIEF DESCRIPTION OF THE DRAWINGS

FIG. 1 is a view in elevation of a bearing embodying the concept of the present invention.

FIG. 2 is a view taken on the line 2-2 of FIG. 1.

FIG. 3 is a view showing one of the corrugated spring washers in solid lines, and showing, in fragmented broken lines, a portion of an identical spring adjacent thereto to show the relative orientation of the central springs.

FIG. 4 is a somewhat schematic diagram showing the forces produced by the springs.

FIG. 5 is a somewhat schematic diagram showing the preloading forces in a prior art bearing.

DESCRIPTION OF THE PREFERRED EMBODIMENT

There is shown in FIGS. 1 and 2 a double row spherical roller bearing 10 which is supporting a shaft 12 for rotation about an axis A. The bearing has a housing 14 which is seated on a support surface 16. Bolts 18 extending through bores in lateral flanges 20 of the housing secure the housing to the surface 16. The housing has a front, inwardly extending, flange 22 which defines a circular opening 24 about axis A. The housing has a cylindrical portion 26 which extends rearwardly from flange 22 and terminates at its rearward end in internal threads 28 which receive externally threaded nut 30. The nut defines a circular opening 31 about axis A. The inner surface 22a of flange 22 defines a front wall of a housing chamber 32, and the inner surface 30a of nut 30 defines the opposing rear wall of that chamber. The wall 30a is adjustable, through rotation of the nut 30 in one direction or the other, to adjust the span S between the opposing front and rear walls 22a and 30a of the housing chamber.

The bearing 10 has inner race means 34 and outer race means 36. The inner race means 34 consists of a single tubular member which is received tightly on shaft 12 for rotation therewith. Shaft 12, and tubular member 34, extend through housing openings 24 and 31. A seal 37 is mounted in each opening and around the member 34. Two oppositely canted races 38, 40 are formed on the external surface of tubular member 34. The outer race means 36 consists of two spaced apart outer race members 36a and 36b. The outer race members have canted races 42, 44 opposing the inner races 38, 40. A first circle 46 of rollers 48 is received between races 38 and 42, and a second circle 50 of rollers 48 is received between races 40 and 44.

A wave spring 52, which is in the form of a corrugated washer, is interposed between the inner wall surface 30a of nut 30 and the adjacent side surface 54 of outer race member 36b. A pair 56 of wave springs 52 are sandwiched between the outer race members 36a, 36b. The wave springs 52 of pair 56 are angularly positioned relative to each other for contact only at nodes, such as B, C and D (see FIG. 3).

The spring 52 exerts a force F1 between the housing and the outer race means, as shown in FIG. 4 and urges the outer race member 36b away from the wall 30a of the bearing housing. The spring pair 56 exerts a force F2 between the two outer race members, as shown in FIG. 4, to urge these members apart.

The force F1 exerts a preloading force on the outer race members which, in the absence of the force F2, would act along the path P1 (that is, from spring 52 to outer race member 36b, through the circle 50 of rollers 48, to canted race 40, canted race 38, circle 46 of rollers 48, outer race member 36a, to housing flange 22, and back through the housing to nut 30).

The force F2, however, acts as a reactionary force which counteracts most of the force F1 so that most of the preloading force is transmitted along path P2 directly from one outer race member 36b, through spring pair 56, to outer race member 36a along path P2.

In a typical prior art construction, as shown in FIG. 5, where no springs are used (or perhaps a single preloading spring between the nut and the adjacent outer race member), all of the preloading force (which may be determined by the amount the nut is tightened) is directed from one outer race member, through one circle of rollers, through the inner race member, through the other circle of rollers to the other outer race member and to the housing. The preloading force, which is in addition to the fluctuating operating load F3, increases the wear on the rollers which must bear the full total of the operating load and the preloading force.

In the system of the present invention, the total preloading force F1 is not added to the fluctuating operating load F4 but, instead at least a portion of this force, which is transmitted along the force path P2, by-passes the rollers. At the same time, the two outer race members 36a, 36b are resiliently mounted with respect to each other to permit relative lateral shifting for a more even distribution of the load F4 between the two circles 46, 50 of rollers.

Although the best mode contemplated for carrying out the present invention has been herein shown and described, it will be apparent that modification and variation may be made without departing from what is regarded to be the subject matter of the invention.

What is claimed is:

1. A double row antifriction bearing having a housing and having inner race means and outer race means, said bearing having two rows of rollers mounted between said inner race means and said outer race means, said outer race means comprising two spaced apart annular race members, said housing having two spaced apart opposing wall surfaces between which said two annular race members are received, at least one of said housing wall surfaces defined by a threaded nut adjustable toward and away from the opposite wall surface to adjust the span between said wall surfaces, the combination comprising a first wave spring between said outer race members and engaged with both to bias said race members apart, and a second wave spring between one of said race members and one of said housing wall surfaces, said spring engaged with both said one race member and said one housing wall surface to bias said members apart and thereby bias said other housing wall surface into engagement with said other race member.

2. A double row antifriction bearing having a housing and having inner race means and outer race means, said bearing having two rows of rollers mounted between said inner race means and said outer race means, said outer race means comprising two spaced apart annular race members, said housing having two spaced apart opposing wall surfaces between which said two annular race members are received, at least one of said housing wall surfaces adjustable toward and away from the opposite wall surface to adjust the span between said wall surfaces, the combination comprising first resilient means between said outer race members and engaged with both to bias said race members apart, and second resilient means between one of said race members and one of said housing wall surfaces, said second resilient means engaged with both said one race member and said one housing wall surface to bias said members apart and thereby bias said other housing wall surface into engagement with said other race member.

3. A double row antifriction bearing having a housing and having inner race means and outer race means, said bearing having two rows of rollers mounted between said inner race means and said outer race means, said outer race means comprising two spaced apart annular race members, said housing having two spaced apart opposing wall surfaces between which said two annular race members are received, at least one of said housing wall surfaces defined by a threaded nut adjustable toward and away from the opposite wall surface to adjust the span between said wall surfaces, the combination comprising a pair of wave springs in nodal contact positioned between said outer race members and engaged with both to bias said race members apart, and a wave spring between one of said race members and one of said housing wall surfaces, said spring engaged with both said one race member and said one housing wall surface to bias said members apart and thereby bias said other housing wall surface into engagement with said other race member.

* * * * *